United States Patent [19]

Tsumura et al.

[11] Patent Number: 5,614,600

[45] Date of Patent: Mar. 25, 1997

[54] FIBER-REINFORCED RESIN PLATE AND PROCESS FOR PRODUCING THE SAME

[75] Inventors: Masahiro Tsumura; Hiromi Miyasita; Kaneyoshi Oyama, all of Kamisu-machi, Japan

[73] Assignee: Kashima Oil Co., Ltd., Tokyo, Japan

[21] Appl. No.: 404,457

[22] Filed: Mar. 15, 1995

[30] Foreign Application Priority Data

Jun. 3, 1994 [JP] Japan .................................. 6-144057

[51] Int. Cl.$^6$ ...................... C08F 283/00; C08L 61/00; C08G 8/28
[52] U.S. Cl. ...................... 525/481; 525/485; 525/492; 525/534; 525/935
[58] Field of Search ...................... 525/481, 485, 525/492, 534, 935

[56] References Cited

U.S. PATENT DOCUMENTS

| | | | |
|---|---|---|---|
| 3,804,693 | 4/1974 | Nichols, Jr. | 156/330 |
| 3,923,522 | 12/1975 | Hata et al. | 96/115 R |
| 4,323,412 | 4/1982 | Claybaker | 156/335 |
| 4,391,640 | 7/1983 | Okosai et al. | 525/54.4 |
| 4,398,016 | 8/1983 | Homma et al. | 528/129 |
| 5,380,789 | 1/1995 | Nanaumi et al. | 528/129 |

FOREIGN PATENT DOCUMENTS

| | | |
|---|---|---|
| 51-16068 | 5/1976 | Japan . |
| 53-5707 | 3/1978 | Japan . |
| 61-235413 | 10/1986 | Japan . |
| 62-230843 | 10/1987 | Japan . |
| 63-37138 | 2/1988 | Japan . |
| 63-234014 | 9/1988 | Japan . |
| 64-1755 | 1/1989 | Japan . |
| 2-39928 | 2/1990 | Japan . |
| 2-73824 | 3/1990 | Japan . |
| 2-229823 | 9/1990 | Japan . |
| 2-274714 | 11/1990 | Japan . |
| 3-247616 | 11/1991 | Japan . |
| 4-42804 | 2/1992 | Japan . |
| 4-145116 | 5/1992 | Japan . |
| 4-142359 | 5/1992 | Japan . |
| 4-250034 | 9/1992 | Japan . |
| 4-348933 | 12/1992 | Japan . |
| 5-16276 | 1/1993 | Japan . |
| 5-217900 | 8/1993 | Japan . |
| 6-228257 | 8/1994 | Japan . |

OTHER PUBLICATIONS

Patent Abstracts of Japan, No. 155 (P-1562), JP-5-40646, Feb. 19, 1993.

*Primary Examiner*—John C. Bleutge
*Assistant Examiner*—Randy Gulakowski
*Attorney, Agent, or Firm*—Oblon, Spivak, McClelland, Maier & Neustadt, P.C.

[57] ABSTRACT

A fiber-reinforced resin plate comprising a fibrous base material and a matrix bonding the fibers contained in the fibrous base material, the matrix being formed by curing a resin composition comprising a highly reactive modified phenolic resin (A) prepared by polycondensing a petroleum heavy oil or pitch, a formaldehyde polymer and a phenol in the presence of an acid catalyst to thereby prepare a modified phenolic resin and-reacting the resultant modified phenolic resin with a phenol in the presence of an acid catalyst to thereby lower the molecular weight of the modified phenolic resin, and an epoxy resin (B). Also, a prepreg and a process for producing the fiber-reinforced resin plate. This fiber-reinforced resin plate is excellent not only in adhesion to copper and other metals, heat resistance and electrical insulating properties but also in dimensional stability, strength and other mechanical properties, especially those at heating, because of the formation of the matrix by curing of the above resin composition comprising the highly reactive modified phenolic resin (A) and the epoxy resin (B).

23 Claims, No Drawings

5,614,600

FIBER-REINFORCED RESIN PLATE AND PROCESS FOR PRODUCING THE SAME

FIELD OF THE INVENTION

The present invention relates to a fiber-reinforced resin plate containing as a resin matrix a resin composition comprising a highly reactive modified phenolic resin and an epoxy resin, which plate is excellent not only in adhesion to copper and other metals, heat resistance and electrical insulating properties but also in dimensional stability, strength and other mechanical properties, especially those at heating. Also, the present invention relates to a process for producing the fiber-reinforced resin plate.

BACKGROUND OF THE INVENTION

The fiber-reinforced resin plate in which a phenolic resin is impregnated into a fibrous base material and cured to thereby form a matrix, for example, a fiber-reinforced resin laminate, has conventionally been employed in various industrial materials such as electrical insulating materials. The fiber-reinforced resin plate in which a phenolic resin is employed as a matrix may be produced by first impregnating a fibrous base material with a phenolic resin varnish obtained by dissolving a phenolic resin in an organic solvent, secondly drying the fibrous base material for half-curing the phenolic resin to thereby prepare prepregs, thirdly laminating a predetermined number of prepregs and finally completely curing the phenolic resin.

For example, a resol-type phenolic resin obtained by reacting a phenol compound such as phenol and an alkylated phenol with formaldehyde has conventionally been used as such a phenolic resin for use in the production of the fiber-reinforced resin plate.

However, the fiber-reinforced resin plate prepared with the use of the above resol-type phenolic resin has drawbacks in that not only are its electrical insulating properties low but also its heat resistance is unsatisfactory.

Fiber-reinforced resin plates respectively containing various modified phenolic resins as matrixes have been proposed in order to overcome the above drawbacks. These fiber-reinforced resin plates respectively containing modified phenolic resins include, for example, a fiber-reinforced laminate of resol-type oil-modified aromatic hydrocarbon/phenolic resin (see Japanese Patent Publication No. 51(1976)-16068), a fiber-reinforced laminate of oil-modified mesitylene/phenol/formaldehyde resin (see Japanese Patent Publication No. 53(1978)-5707) and a glass-fiber-reinforced phenolic resin plate which contains great amount of magnesium hydroxide and, as a fiber base material, a non-woven fabric of glass fiber (see Japanese Patent Laid-Open Publication No. 2(1990)-39928).

The epoxy resin has low molding shrinkage and is excellent in heat resistance, wear resistance, chemical resistance and electrical insulating properties, so that its use has been attempted as a matrix of a fiber-reinforced resin plate. However, the fiber-reinforced resin plate using the epoxy resin alone as the matrix has poor heat resistance and difficulty in retaining strength at the time of heating, so that its practical application has encountered various problems.

Thus, various fiber-reinforced resin plates have been proposed for resolving the problems, which include, for example, a fiber-reinforced epoxy resin laminate containing a novolak-type phenolic resin (see Japanese Patent Laid-Open Publication No. 2(1990)-73824), a glass-fiber-reinforced bisphenol A epoxy resin laminate containing an imidazole (see Japanese Patent Laid-Open Publication No. 64 (1989)-1755), a fiber-reinforced resin laminate containing a matrix whose mixing principal resins are an epoxy resin containing a novolak resin and a bisphenol sulfone (see Japanese Patent Laid-Open Publication No. 63(1988)-234014) and a fiber-reinforced resin laminate containing a matrix whose mixing principal resins are an epibis epoxy resin containing a novolak resin, a phenolic-novolak-type epoxy resin and bisphenol A (see Japanese Patent Laid-Open Publication No. 63(1988)-37138).

However, the above conventional fiber-reinforced resin plates and fiber-reinforced resin laminates each containing a matrix composed of a modified phenolic resin or an epoxy resin are still unsatisfactory in electrical insulation, heat resistance and strength retention at the time of heating.

The inventors previously proposed fiber-reinforced resin laminates prepared using a varnish containing a modified phenolic resin obtained by poly-condensation of a petroleum heavy oil or pitch, a formaldehyde polymer and a phenol, which resin contains substantially no acid, and an epoxy resin as a result of the development for a fiber-reinforced resin laminate having both of the electrical insulating properties, heat resistance, etc. and the mechanical strength, dimensional stability, etc. improved with a good balance (see Japanese Patent Laid-Open Publication Nos. 4(1992)-348933 and 5(1993)-16276). However, even the above fiber-reinforced resin laminates are unsatisfactory in heat resistance, dimensional stability and mechanical properties at the time of heating, so that further improvement has been desired.

Thus, in substitution for the above modified phenolic resin, the inventors proposed the use of a modified phenolic resin having a low-molecular-weight-component content of 10% by weight or below and containing substantially no acid as the matrix (see Japanese Patent Laid-Open Publication No. 5(1993)-217900).

However, the reactivity of this modified phenolic resin with an epoxy resin is not satisfactory, so that further improvements in mechanical properties such as strength and dimensional stability and heat resistance have been demanded from the fiber-reinforced resin plate containing the above resin.

Often, the fiber-reinforced resin plate has its one side surface bonded to a metal foil to use as a wiring substrate, etc. The above conventional fiber-reinforced resin plates are required to have further improvement in the adhesion to a foil of a metal such as copper.

The inventors have conducted investigations with respect to the above drawbacks of the prior art. As a result, they have found that the reactivity with an epoxy resin is surprisingly improved by lowering the molecular weight of the modified phenolic resin to be blended with the epoxy resin for forming a matrix of a fiber-reinforced resin plate through a reaction of the modified phenolic resin with a phenol in the presence of an acid catalyst, and that a fiber-reinforced resin plate which is excellent not only in adhesion to a metal such as copper, heat resistance and electrical insulating properties but also in dimensional stability, strength and other mechanical properties, especially those at the time of heating, can be provided by employing a resin composition comprising the above reactivity-improved modified phenolic resin and an epoxy resin as a matrix material. The present invention has been completed on the basis of these findings.

OBJECT OF THE INVENTION

The present invention has been made for resolving the above drawbacks of the prior art. The object of the present invention is to provide a fiber-reinforced resin plate which is excellent not only in adhesion to a metal such as copper, heat resistance and electrical insulating properties but also in dimensional stability, strength and other mechanical properties, especially those at the time of heating, and also to provide a process for producing the fiber-reinforced resin plate.

SUMMARY OF THE INVENTION

The fiber-reinforced resin plate of the present invention comprises a fibrous base material and a matrix, the matrix being formed by curing a resin composition comprising a highly reactive modified phenolic resin (A) prepared by polycondensing a petroleum heavy oil or pitch, a formaldehyde polymer and a phenol in the presence of an acid catalyst to thereby prepare a modified phenolic resin and reacting the resultant modified phenolic resin with a phenol in the presence of an acid catalyst to thereby lower the molecular weight of the modified phenolic resin, and an epoxy resin (B).

The fiber-reinforced resin plate of the present invention may be in the form of a laminate comprising a plurality of fibrous base material layers.

In the fiber-reinforced resin plate of the present invention, it is preferred that the resin composition contain the highly reactive modified phenolic resin (A) and the epoxy resin (B) in a mixing weight ratio of 10/90 to 90/10.

The prepreg of the present invention is used in the production of the fiber-reinforced resin plate of the present invention, and comprises a fibrous base material and a resin composition impregnated into the fibrous base material and half-cured, the resin composition comprising a highly reactive modified phenolic resin (A) prepared by polycondensing a petroleum heavy oil or pitch, a formaldehyde polymer and a phenol in the presence of an acid catalyst to thereby prepare a modified phenolic resin and reacting the resultant modified phenolic resin with a phenol in the presence of an acid catalyst to thereby lower the molecular weight of the modified phenolic resin, and an epoxy resin (B).

The process for producing a fiber-reinforced resin plate according to the present invention comprises:

dissolving in an organic solvent a resin composition comprising a highly reactive modified phenolic resin (A) prepared by polycondensing a petroleum heavy oil or pitch, a formaldehyde polymer and a phenol in the presence of an acid catalyst to thereby prepare a modified phenolic resin and reacting the resultant modified phenolic resin with a phenol in the presence of an acid catalyst to thereby lower the molecular weight of the modified phenolic resin, an epoxy resin (B) and a curing agent and/or curing accelerator (C) to thereby prepare a varnish, impregnating a fibrous base material with the varnish, followed by drying and half-curing the resin composition to thereby prepare a prepreg, and completely curing the resin composition contained in the prepreg.

In the process for producing a fiber-reinforced resin plate according to the present invention, a plurality of the prepregs may be prepared and laminated prior to the complete curing of the resin composition.

In the process of the present invention, the varnish may be prepared by mixing a phenolic resin varnish obtained by dissolving the highly reactive modified phenolic resin (A) in an organic solvent with an epoxy resin varnish obtained by dissolving the epoxy resin (B) in an organic solvent. Alternatively, the varnish may be prepared by adding and dissolving the epoxy resin (B) in a phenolic resin varnish obtained by dissolving the highly reactive modified phenolic resin (A) in an organic solvent.

In the process of the present invention, it is preferred that the organic solvent be at least one member selected from the group consisting of aromatic hydrocarbons, amides, ketones, halogenated aromatic hydrocarbons and alcohols. Also, it is preferred that the aromatic hydrocarbon be at least one compound selected from the group consisting of benzene, toluene and xylene.

In the process of the present invention, the resin composition contained in the prepreg may generally be completely cured by thermal curing treatment at 150° to 300° C.

DETAILED DESCRIPTION OF THE INVENTION

Hereinbelow, the present invention will be described in greater detail.

The fiber-reinforced resin plate of the present invention comprises a fibrous base material and a matrix bonding the fibers contained in the fibrous base material, the matrix being formed by curing a resin composition comprising a highly reactive modified phenolic resin (A) and an epoxy resin (B).

In particular, the highly reactive modified phenolic resin (A) is produced by subjecting the modified phenolic resin obtained in a specified polycondensation step to a molecular weight lowering step conducted under specified conditions to thereby lower the molecular weight of the modified phenolic resin.

In the polycondensation step for producing the highly reactive modified phenolic resin (A), specifically, a petroleum heavy oil or pitch, a formaldehyde polymer and a phenol are polycondensed in the presence of an acid catalyst.

The petroleum heavy oil or pitch used as a starting material in the above polycondensation reaction includes a distillation residue, a hydrocracking residue and a catalytic cracking residue of crude oil, a thermal cracking residue of naphtha or LPG, and a vacuum distillate, an extract by solvent extraction and a thermal treatment product from such residues. It is preferred that a petroleum heavy oil or pitch having appropriate fa and Ha values be selected from these and used.

For example, it is preferred that the petroleum heavy oil or pitch have a ratio of aromatic hydrocarbon (fa) ranging from 0.40 to 0.95, especially from 0.5 to 0.8, still especially from 0.55 to 0.75 and have a ratio of hydrogen of aromatic ring (Ha) ranging from 20 to 80%, especially from 25 to 60%, still especially from 25 to 50 %.

The ratio of aromatic hydrocarbon (fa) and the ratio of hydrogen of aromatic ring (Ha) are calculated by the following formulae from the data obtained by $^{13}$C-NMR and $^{1}$H-NMR measurements of the petroleum heavy oil or pitch.

$$fa \text{ value} = \frac{\text{number of aromatic carbon atoms in oil or pitch}}{\text{number of all carbon atoms in oil or pitch}}$$

$$Ha \text{ value} = \frac{\text{number of hydrogen atoms of aromatic rings in oil or pitch}}{\text{number of all hydrogen atoms in oil or pitch}} \times 100 \, (\%)$$

With respect to the aromatic hydrocarbon composing the petroleum heavy oil or pitch used in the present invention, although the number of condensed rings is not particularly limited, it is generally preferred that the petroleum heavy oil or pitch be mainly composed of polycyclic aromatic hydrocarbons each having 2 to 4 condensed rings.

The formaldehyde polymer used as a starting material in combination with the petroleum heavy oil or pitch in the present invention acts as a crosslinking agent, which includes, for example, linear polymers, such as paraformaldehyde and polyoxymethylene (especially, oligomer), and cyclic polymers, such as trioxane.

In the polycondensation step conducted in the present invention, the petroleum heavy oil or pitch is mixed with the formaldehyde polymer in a ratio of the number of moles, in terms of formaldehyde, of the formaldehyde polymer to 1 mole, calculated from the average molecular weight thereof, of the petroleum heavy oil or pitch of generally from 1 to 15, preferably from 2 to 12, and still preferably from 3 to 11. When the above mixing ratio of the formaldehyde polymer to the petroleum heavy oil or pitch is less than 1, unfavorably, it would be occasionally difficult to obtain a fiber-reinforced resin plate having a satisfactory strength. On the other hand, when the above-mentioned mixing ratio is greater than 15, the properties of obtained fiber-reinforced resin plates and yields of modified phenolic resins would no longer vary, so that the use of the formaldehyde polymer in the ratio greater than 15 would be useless. The excess use of the formaldehyde polymer has the danger of hindering the lowering of the molecular weight of the modified phenolic resin in the below described molecular weight lowering step.

Examples of the phenols used as starting materials in the polycondensation step include phenolic compounds, such as phenol, cresol, xylenol, resorcinol, catechol, hydroquinone, bisphenol A, and bisphenol F, and naphtol compounds, such as α-naphtol and β-naphtol. These may be used individually, or at least two may be selected therefrom and used in combination.

The above phenols etc. are added to the starting material mixture until a ratio of the number of moles of the phenol to 1 mole, calculated from the average molecular weight thereof, of the petroleum heavy oil or pitch of generally 0.3 to 5, preferably from 0.5 to 3.

When the above ratio is less than 0.3, the reactivity between the petroleum heavy oil or pitch and the formaldehyde is lower than that between the phenol and the formaldehyde, so that occasionally a satisfactory crosslinking density would not be attained with the result that a fiber-reinforced resin plate having a satisfactory strength could not be obtained. In particular, it is likely for the fiber-reinforced resin plate to exhibit unfavorably low impact resistance and hence brittleness. On the other hand, when the phenols are added in a ratio greater than 5, it is likely that the effect of the modification of the phenolic resin on the quality improvement will be decreased.

In the polycondensation step conducted in the present invention, an acid catalyst is used for polycondensing the petroleum heavy oil or pitch, the formaldehyde polymer and the phenol. Brønsted and Lewis acids may be used as such an acid catalyst. Brønsted acid is preferred. Examples of Brønsted acids include toluenesulfonic acid, xylenesulfonic acid, hydrochloric acid, sulfuric acid and formic acid. Of these, p-toluenesulfonic acid and hydrochloric acid are particularly preferred.

The above acid catalyst is preferably used in an amount of 0.1 to 30% by weight, still preferably 1 to 20% by weight, relative to the weight of the total of the petroleum heavy oil or pitch, the formaldehyde polymer and the phenol.

In the polycondensation step in which the above described starting materials and acid catalyst are employed, for example, it is preferred that the polycondensation of the starting materials be effected by gradually adding the phenol, until the above ratio, to a mixture containing in the above ratio the petroleum heavy oil or pitch and the formaldehyde polymer while being heated under agitation in the presence of the acid catalyst.

The phenol is preferably gradually added by dropping or other methods at a rate of 0.05 to 5 wt. %/min, still preferably 0.1 to 2 wt. %/min, relative to the weight of the total of the reaction mixture.

In the present invention, the time at which the phenol is added to the mixture of the petroleum heavy oil or pitch and the formaldehyde polymer is not particularly limited. However, it is preferred that the gradual addition of the phenol be initiated within a period of from a time at which the conversion of formaldehyde, estimated from the amount of remaining free formaldehyde, is substantially 0% to a time at which the conversion of formaldehyde is 70% or less, especially 50% or less.

With respect to the heating and agitation of the mixture of the petroleum heavy oil or pitch and the formaldehyde polymer in the presence of the acid catalyst, the reaction temperature and time are selected, depending on the starting material formulation, the rate of addition of the phenol and the properties of the resin to be obtained. Naturally, the reaction temperature and the reaction time are mutually affecting factors. The heating under agitation of the above starting material mixture in the presence of the acid catalyst may preferably be conducted at 50° to 160° C., especially 60° to 120° C. for 0.5 to 10 hr, especially 1 to 5 hr.

When the reaction for the production of the modified phenolic resin is conducted by a batch process, the reaction can be performed in one stage, which is advantageous. Further, when the above production is conducted by a continuous process, it is not necessary to use an apparatus having been employed in the production of the conventional modified phenolic resin, in which a plurality of reaction products must continuously be mixed in respective predetermined proportions and thus difficult control is inevitable. Instead, the continuous production can be performed by disposing a complete mixing type reactor vessel in the middle and introducing the phenol to be added thereinto at a predetermined rate. This allows an apparatus cost to be relatively low, and ensures good operability.

In the present invention, the polycondensation reaction of the petroleum heavy oil or pitch, the formaldehyde polymer and the phenol can be performed in the absence of a solvent. However, an appropriate solvent may be used to lower the viscosity of the reaction mixture (reaction system) so that uniform reaction is ensured.

Examples of such solvents include aromatic hydrocarbons, such as benzene, toluene and xylene; halogenated aromatic hydrocarbons, such as chlorobenzene; nitro-substituted aromatic hydrocarbons, such as nitrobenzene; nitro-substituted aliphatic hydrocarbons, such as nitroethane and nitropropane; and halogenated aliphatic hydrocarbons, such as perchloroethylene, trichloroethylene and carbon tetrachloride.

The highly reactive modified phenolic resin contained in the resin composition composing the matrix in the fiber-reinforced resin plate of the present invention can be prepared by subjecting the modified phenolic resin obtained by the above polycondensation reaction to the following molecular weight lowering step to thereby lower the molecular weight thereof. In the molecular weight lowering step, the modified phenolic resin reacts with the phenol in the presence of an acid catalyst but in the absence of formaldehyde polymer and other crosslinking agents, so that the modified phenolic resin comes to have a lowered molecular weight. In this molecular weight lowering step, the reaction conditions and the amounts of raw materials and catalyst are controlled so as for the modified phenolic resin to have a lowered molecular weight by the reaction thereof with the phenol.

Besides the modified phenolic resin, the acid catalyst, unreacted materials, low molecular weight components, reaction solvent and other matter may remain in the reaction mixture obtained by the above polycondensation reaction, which affect the reaction conditions during the molecular weight lowering step and the amounts of raw materials and catalyst involved in the reaction. For example, when the modified phenolic resin for use in the molecular weight lowering step contains the acid catalyst, the amount of acid catalyst to be added in the above step is affected. Further, especially when the modified phenolic resin contains a large amount of formaldehyde polymer being a crosslinking agent as an unreacted component, there is the danger that the polycondensation of the modified phenolic resin, the formaldehyde polymer and the phenol precedes to thereby hinder the lowering of the molecular weight of the modified phenolic resin.

Therefore, it is preferred that the modified phenolic resin for use in the molecular weight lowering step do not contain the acid catalyst and unreacted materials or the reaction solvent, especially do not contain the acid catalyst and formaldehyde polymer, in amounts such that the molecular weight lowering reaction is hindered, from the viewpoint that the reaction conditions during the molecular weight lowering step are appropriately set so as to accomplish effective lowering of the molecular weight of the modified phenolic resin through the reaction thereof with the phenol.

The above modified phenolic resin may be prepared by appropriately selecting the amounts of starting materials, acid catalyst and reaction solvent employed in the polycondensation reaction or the polycondensation reaction conditions to thereby prevent excess unreacted components, acid catalyst and reaction solvent from remaining in the reaction mixture, or alternatively by appropriately purifying the reaction mixture obtained in the polycondensation reaction to thereby remove any unreacted components, low molecular weight components, acid catalyst and reaction solvent.

The method for purifying the reaction mixture, i.e., the crude modified phenolic resin containing the acid catalyst, unreacted components, low molecular weight components and reaction solvent includes, for example, purification treatment (i) in which the reaction mixture is treated to effect precipitation with a specific solvent to thereby remove solvent-soluble components containing unreacted components, and purification treatment (ii) in which the reaction mixture is dissolved in a specific solvent to thereby extract and remove any catalyst residue.

The above purification treatment (i) removes those of the components contained in the petroleum heavy oil or pitch as a starting material which have low reactivity so as to remain in the reaction mixture in the unreacted or incompletely reacted state and the solvent optionally used in the polycondensation reaction.

This purification treatment (i) may be accomplished by putting the reaction mixture obtained in the polycondensation step, at any time after the production thereof, in a solvent comprising at least one compound selected from the group consisting of aliphatic and alicyclic hydrocarbons each having up to 10 carbon atoms to thereby precipitate the principal resin component and remove components soluble in the solvent, i.e., those unreacted and remaining due to incomplete reaction and the solvent used in the polycondensation reaction.

Aliphatic and alicyclic hydrocarbons, such as pentane, hexane, heptane and cyclohexane, are used as such a hydrocarbon solvent for purification. n-Hexane is particularly preferred.

In the above purification treatment (ii), the acid catalyst and the formaldehyde polymer as a crosslinking agent which remain in the reaction mixture are removed, thereby producing a modified phenolic resin containing substantially no acid and no crosslinking agent. When the catalyst remains in the modified phenolic resin, the amount of acid catalyst to be added in the molecular weight lowering step must be determined taking the above acid catalyst residue into account, so that the control of reaction conditions becomes difficult.

The above purification treatment (ii) may be accomplished by treating the reaction mixture with an extraction solvent capable of dissolving most of the modified phenolic resin but dissolving the acid catalyst used in the polycondensation of the starting materials in a solubility of 0.1 or less to thereby remove the catalyst residue and the crosslinking agent.

The extraction solvent is not particularly limited as long as it has the above properties, which may, however, preferably be selected from among aromatic hydrocarbons, such as benzene, toluene and xylene. Of these, toluene is particularly preferred.

In the purification treatment (ii) conducted in the present invention, the temperature and other conditions are not particularly limited as long as the above performance of the extraction solvent is fully exhibited. The reaction mixture may be put in the extraction solvent, or alternatively the solvent may be added to the reaction mixture. Thus, the purification treatment (ii) can be accomplished readily and simply.

The modified phenolic resin containing substantially no acid, obtained by the above purification treatment (ii), is generally in the form of a varnish having the resin dissolved in a solvent. The modified phenolic resin in the form of a varnish, if it is a final purified product, may be used as it is as a starting material for the subsequent molecular weight lowering step. Alternatively, it may be put in a solvent in which the modified phenolic resin is insoluble, such as n-hexane, to effect precipitation to thereby obtain powder of the modified phenolic resin prior to utilization.

Most of the catalyst residue remaining in the reaction mixture is removed by the purification treatment (ii). If desired, however, thee modified phenolic resin obtained by the purification treatment (ii) may be subjected to a neutralization treatment and/or a water washing treatment to thereby effect further removal of the catalyst residue, such as an acid, in the resin.

The neutralization treatment may be performed by adding a basic substance to the modified phenolic resin obtained by the purification treatment (ii). Examples of such basic substances include alkali metal and alkaline earth metal hydroxides, such as sodium, potassium, calcium and magnesium hydroxides, ammonia, diethylenetriamine, triethylenetetramine, aniline and phenylenediamine.

In the purification step to be conducted in the present invention, the purification treatments (i) and (ii) may be carried out in arbitrary sequence. However, the modified phenolic resin obtained by the purification step (ii) is in the form of a varnish. This modified phenolic resin in the form of a varnish may be used as it is or after regulating the resin concentration by adding the organic solvent or by concentrating as a starting material in the subsequent molecular weight lowering step. Further, the modified phenolic resin in the form of a varnish may be put in a solvent in which the modified phenolic resin is insoluble, for example, n-hexane to thereby recrystallize and harvest powdery modified phenolic resin for use as a starting material in the subsequent molecular weight lowering step.

The highly reactive modified phenolic resin for use in the present invention may be produced by reacting the above modified phenolic resin, i.e., the reaction product obtained in the polycondensation step as it is or after having been purified, with a phenol in the presence of an acid catalyst but in the absence of formaldehyde polymer and other crosslinking agents, so that the modified phenolic resin comes to have a lowered molecular weight.

In the above molecular weight lowering reaction, it is believed that the acetal and/or methylene ether bond present in the molecule of the modified phenolic resin is broken and dissociated to thereby lower the molecular weight of the modified phenolic resin, and that the phenol is bonded to a terminal resulting from the dissociation to thereby increase the phenol content of the modified phenolic resin, so that a highly reactive modified phenolic resin having a low resin melt viscosity and being excellent in the reactivity with an epoxy resin can be obtained.

The amounts, types and combinations of starting materials and acid catalyst employed in the molecular weight lowering step and the reaction conditions such as reaction temperature, are not particularly limited as long as the desired lowering of the molecular weight of the modified phenolic resin and desired improvement in the reactivity with an epoxy resin can be realized.

Therefore, for example, the phenols and acid catalysts mentioned hereinbefore as being suitable for use in the polycondensation step may also be suitably employed in the molecular weight lowering step.

In the molecular weight lowering step conducted in the present invention, the phenol is employed in an amount of generally at least 10 parts by weight, preferably from 15 to 250 parts by weight, still preferably from 20 to 200 parts by weight, per 100 parts by weight of the modified phenolic resin. When the amount of the phenol is at least 10 parts by weight, the molecular weight lowering reaction is advanced to an extent sufficient for obtaining the desired effect. However, the use of the phenol in excess would result in the remaining of a large amount of unreacted phenol, thereby increasing the cost for posttreatment. There is no need to add the phenol gradually, and the whole amount thereof may be put in the reaction system at once at the initiation of the reaction.

The acid catalyst is added preferably in an amount of 0.1 to 15 parts by weight, still preferably from 0.2 to 10 parts by weight per 100 parts by weight of the modified phenolic resin.

In the molecular weight lowering step, the reaction may be carried out in the absence or presence of a reaction solvent. The reaction solvent is not particularly limited as long as it does not hinder the above molecular weight lowering reaction. For example, the solvents employed in the polycondensation reaction and, further, ethers such as tetrahydrofuran, ketones such as methyl ethyl ketone, methyl isobutyl ketone and acetone, and alcohols such as methyl alcohol and n-butanol may be used in the molecular weight lowering step. The above solvent is used preferably in an amount of 0 to 300 parts by weight per 100 parts by weight of the modified phenolic resin.

Although the reaction temperature is not particularly limited, it is generally in the range of from 50° to 120° C., preferably from 80° to 120° C. Also, although the reaction time is not particularly limited, it is generally in the range of from 15 min to 3.0 hr, preferably from 30 min to 2.0 hr.

The highly reactive modified phenolic resin obtained through the above molecular weight lowering step has a lowered number average molecular weight, preferably a number average molecular weight of from 300 to 800 (a) and an improved reactivity with an epoxy resin (judged on the basis of gelation time; shorter gelation time means higher reactivity) (b), as compared with those of the modified phenolic resin obtained by the polycondensation step. The resin composition containing the highly reactive modified phenolic resin with an epoxy resin is capable of having the gelation time of from 130 min to 240 min.

When a resin composition comprising a blend of the highly reactive modified phenolic resin and an epoxy resin is used as a matrix material, the resultant fiber-reinforced resin plate can have improvements in the heat resistance, adhesion to a metal foil and mechanical properties such as dimensional stability and strength. In particular, a fiber-reinforced resin plate can be obtained which is low in thermal expansion coefficient (dimensional stability) and high in glass transition temperature (heat resistance), peel strength from a metal foil and flexural strength (strength).

Also, the highly reactive modified phenolic resin is excellent in the electrical insulating properties and moisture resistance as well, thereby helping to impart these properties to the fiber-reinforced resin plate.

There is the possibility that unreacted components and acid catalyst residue remain in the highly reactive modified phenolic resin obtained by the above molecular weight lowering step. Therefore, it is desired to remove the unreacted components and acid catalyst.

For example, the removal of the unreacted components and acid catalyst is preferably conducted by a washing treatment with distilled water or a mixture of distilled water and isopropyl alcohol.

In the washing treatment, the highly reactive modified phenolic resin to be treated may be diluted with a solvent. Examples of the solvents suitably employed in the washing treatment of the highly reactive modified phenolic resin include toluene; mixed solvents each composed of toluene and an alcohol such as methanol or ethanol; mixed solvents each composed of toluene and a ketone such as acetone, methyl ethyl ketone and methyl isobutyl ketone; and mixed solvents each composed of toluene and ethers such as tetrahydrofuran.

After the removal of the unreacted components and acid catalyst, the highly reactive modified phenolic resin is preferably subjected to either an extraction solvent removal or resin crystallization treatment with a solvent selected from aliphatic and alicyclic hydrocarbons each having up to 10 carbon atoms and mixtures thereof. Examples of these hydrocarbon solvents include the solvents set forth in the purification treatment (i) for the modified phenolic resin. n-Hexane is particularly preferred.

The above purification treatments remove the acid catalyst, unreacted materials, reaction solvent, etc. remaining in the resin to thereby provide a highly reactive modified phenolic resin which contains substantially no acid, thereby exhibiting no corrosive action to metals. The terminology "containing substantially no acid" used herein means that either an acid or the like is completely absent, or an extremely small amount thereof remains which however does not exhibit any significant corrosive action to metals.

The resin composition for use as a matrix material in the present invention comprises an epoxy resin (B) together with the above highly reactive modified phenolic resin (A). The epoxy resin generally exhibits less molding shrinkage, excellent heat, wear and chemical resistances, and high electrical insulating properties. The epoxy resin may optionally be employed in combination with a curing agent and/or curing accelerator (C).

Various epoxy resins are available, which include, for example, glycidyl ether, glycidyl ester, glycidylamine, mixed and alicyclic epoxy resins.

In particular, examples of the glycidyl ether (based on phenol) epoxy resins include bisphenol A, biphenyl, bisphenol F, tetrabromobisphenol A, tetraphenylolethane, phenolic novolak ando-cresol novolak epoxy resins.

Examples of the glycidyl ether (based on alcohol) epoxy resins include polypropylene glycol and hydrogenated bisphenol A epoxy resins.

Examples of the glycidyl ester epoxy resins include hexahydrophthalic anhydride and dimer acid epoxy resins.

Examples of the glycidylamine epoxy resins include diaminodiphenylmethane, isocyanuric acid and hydantoinic acid epoxy resins.

Examples of the mixed epoxy resins include p-aminophenol and p-oxybenzoic acid epoxy resins.

Of the above epoxy resins, bisphenol A, biphenyl, glycidylamine and phenolic novolak epoxy resins are preferred. At least two members selected from the above epoxy resins may be used in combination.

In the resin composition to be employed as a matrix material in the present invention, although the blending ratio of the epoxy resin to the highly reactive modified phenolic resin is not particularly limited, it is generally preferred that, assuming that the total of the epoxy resin and the modified phenolic resin is 100 parts by weight, the epoxy resin be blended with the modified phenolic resin at a ratio of 10/90 to 90/10 (parts by weight), especially 20/80 to 80/20 (parts by weight).

When the weight ratio of the modified phenolic resin is lower than 10 parts, the effect for improving the heat and moisture resistances of the obtained fiber-reinforced resin plate is not satisfactory. When the above ratio is higher than 90 parts by weight, the molding temperature is likely to be unfavorably high.

Various conventional curing agents and accelerators used for curing epoxy resins can be employed as a curing agent and/or accelerator (C) suitably incorporated in the resin composition for use as the matrix material. Examples of such curing agents include cyclic amines, aliphatic amines, polyamides, aromatic polyamines and acid anhydrides.

In particular, examples of suitable cyclic amines include hexamethylenetetramine, and examples of suitable aliphatic amines include diethylenetriamine, triethylenetetramine, tetraethylenepentamine, diethylaminopropylamine, N-aminoethylpiperazine, isophoronediamine, bis (4-amino-3-methylcyclohexyl)methane and menthanediamine.

Examples of the polyamides include condensates of fatty acids from vegetable oil (dimer or trimer acid) and aliphatic polyamines.

Examples of the aromatic polyamines include m-phenylenediamine, 4,4'-diaminodiphenylmethane, 4,4'-diaminodiphenyl sulfone and m-xylylenediamine.

Examples of the acid anhydrides include phthalic anhydride, tetrahydrophthalic anhydride, hexahydrophthalic anhydride, trimellitic anhydride, pyromellitic anhydride, benzophenonetetracarboxylic anhydride, chlorendic anhydride, dodecenylsuccinic anhydride, methyltetrahydrophthalic anhydride and methylendomethylenetetrahydrophthalic anhydride.

Examples of the curing accelerators include diazabicloalkenes such as 1,8-diazabicyclo(5,4,0)undecene-7 and derivatives thereof; tertiary amines such as triethylenediamine, benzyldimethylamine, triethanolamine, dimethylaminoethanol and tris(dimethylaminomethyl)phenol; imidazoles such as 2-methylimidazole, 2-ethyl-4-methylimidazole, 2-phenylimidazole, 2-phenyl-4-methylimidazole and 2-heptadecylimidazole;

organophosphines such as tributylphosphine, methyldiphenylphosphine and triphenylphosphine; tetrasubstituted-phosphonium-tetra-substituted-borates such as tetraphenylphosphonium tetraphenyl borate; tetraphenyl borates such as 2-ethyl-4-methylimidazolyl tetraphenyl borate and N-methylmorpholinyl tetraphenyl borate; Lewis acids such as boron trifluoride/amine complex; Lewis bases such as dicyanodiamide and adipodihydrazide; and polymercaptans and polysulfides. The above curing agents and curing accelerators may be employed individually, or at least two selected therefrom may be used in combination.

In addition to the above highly reactive modified phenolic resin (A) and epoxy resin (B) and optionally incorporated curing agent and/or curing accelerator (C), the resin composition for use in the present invention may contain additives, such as antioxidants, ultraviolet absorbers, viscosity modifiers, flame retarders, fillers and pigments. This resin composition may contain another thermosetting resin as long as it is not detrimental to the essence of the present invention.

The fiber-reinforced resin plate of the present invention comprises the matrix formed by curing the above resin composition comprising the highly reactive modified phenolic resin (A) and epoxy resin (B) and optionally incorporated curing agent and/or curing accelerator (C) and the fibrous base material bonded by the matrix.

The configuration of the fibrous base material for use in the present invention is not particularly limited as long as it is a fibrous structure such as a sheet or tape form. The configuration is appropriately selected depending on the properties required for the fiber-reinforced resin plate to possess. For example, the fibrous base material may be a cloth or nonwoven fabric composed of inorganic or organic fibers or paper. In particular, examples of the fibrous base materials include inorganic fiber cloths such as a carbon fiber cloth and a glass cloth; nonwoven fabrics of inorganic fibers such as carbon fibers and glass fibers; and papers such as kraft papers and linter papers.

When strict requirements as for electrical insulating properties are imposed on the fiber-reinforced resin plate, a glass cloth and a nonwoven fabric of glass fibers are preferred. A glass cloth is more suitable.

The fiber-reinforced resin plate of the present invention may be either a single plate composed of a single layer of fibrous base material or a laminate composed of at least two layers, generally 5 to 30 layers of fibrous base material.

The fiber-reinforced resin plate of the present invention may have on its one side or both sides a foil layer(s) of metal such as copper, nickel, aluminum or chromium. This structure provides a fiber-reinforced resin plate suitable for use as an electronic or electrical material.

The above fiber-reinforced resin plate of the present invention may basically be produced by the process described in the previous Japanese Patent Application No. 5(1993)-217900.

The fiber-reinforced resin plate of the present invention may also be produced from the prepreg comprising the above fibrous base material and the above resin composition infiltrated into the fibrous base material and half-cured.

The process for producing a fiber-reinforced resin plate according to the present invention, including the production of the above prepreg, will be described below.

In the process for producing a fiber-reinforced resin plate according to the present invention, first, the above resin composition comprising the highly reactive modified phenolic resin (A) and epoxy resin (B) optionally together with the additives such as the curing agent and/or curing accelerator (C) is dissolved in an organic solvent to thereby prepare a varnish. Subsequently, prepregs are prepared from the varnish and the fibrous base material. Thereafter, a desirable number of prepregs are laminated to thereby obtain the fiber-reinforced resin plate.

The organic solvent used to dissolve the resin composition in the preparation of the varnish is not particularly limited as long as it can dissolve both the resin components, i.e., the highly reactive modified phenolic resin (A) and the epoxy resin (B) in desirable concentrations and desirable concentration proportion. The organic solvent may be a single substance or a mixture.

For example, the above organic solvent may be composed of one in which the solubilities of both the highly reactive modified phenolic resin (A) and the epoxy resin (B) are high, or a mixture of a solvent good for the highly reactive modified phenolic resin (A) and a solvent good for the epoxy resin (B).

Examples of the organic solvents good for the highly reactive modified phenolic resin (A) include aromatic hydrocarbons such as benzene, toluene and xylene; amides such as dimethylformamide; halogenated aromatic hydrocarbons such as chlorobenzene; ethers such as tetrahydrofuran and dioxane; alcohols such as methanol and ethanol; glycols such as ethyl cellosolve; ketones such as acetone, methyl ethyl ketone and methyl isobutyl ketone; esters such as ethylacetate; chloroform, methylene chloride and perchloroethylene; and mixtures thereof. Aromatic hydrocarbons, amides, ketones, halogenated aromatic hydrocarbons and alcohols are preferred among the above solvents for the highly reactive modified phenolic resin. The above solvents may be used either individually or in combination.

On the other hand, examples of the organic solvents good for the epoxy resin include ketones such as acetone, methyl ethyl ketone and methyl isobutyl ketone; alcohols such as methanol and ethanol; aromatic hydrocarbons such as toluene and xylene; and mixtures thereof.

In the preparation of the varnish by dissolving the highly reactive modified phenolic resin (A) and epoxy resin (B) optionally together with the curing agent and/or curing accelerator (C) in the above organic solvent, for example, the concentration of the varnish, the order of dissolution and the conditions for dissolution are appropriately selected depending on the type of the organic solvent, the type of the resin, the required viscosity of the varnish, etc.

For example, the varnish may be produced by first dissolving a highly reactive modified phenolic resin and an epoxy resin in respective organic solvents to thereby prepare a highly reactive modified phenolic resin varnish and an epoxy resin varnish and then mixing the obtained varnishes at an appropriate ratio.

Specifically, the highly reactive modified phenolic resin varnish may be produced by adding the highly reactive modified phenolic resin to the organic solvent at room temperature or a raised temperature at a ratio such that a 10 to 70% solution is obtained and then agitating the mixture for about 10 min to 1 hr, optionally followed by filtration to thereby remove insoluble matter and further optionally followed by appropriately concentrating the solution. The epoxy resin varnish may also be produced in substantially the same manner.

The varnish may also be produced either by directly adding the epoxy resin to the highly reactive modified phenolic resin varnish or by contrarily directly adding the highly reactive modified phenolic resin to the epoxy resin varnish. Further, the varnish may be produced by separately charging the highly reactive modified phenolic resin and the epoxy resin or simultaneously putting a mixture thereof into the organic solvent.

The curing agent and/or curing accelerator may be added either at the time of the production of the epoxy resin varnish or at the time of the mixing of the highly reactive modified phenolic resin varnish with the epoxy resin varnish.

In the present invention, the above varnish is impregnated into the above fibrous base material and dried to thereby evaporate the organic solvent, so that the resin composition is half-cured, resulting in the preparation of a prepreg.

Although the amount of varnish with which the fibrous base material is impregnataed is not particularly limited, it is preferred that the amount of impregnated resin after drying is 1 to 60% by weight, especially 20 to 55% by weight relative to the total weight of the dried prepreg.

The method for drying the prepreg is not particularly limited and may appropriately be selected from the conventional methods.

In the present invention, if desired, a plurality of prepregs thus obtained, for example, about 5 to 30 prepregs are laminated, and the resin composition is completely cured, thereby producing the fiber-reinforced resin plate (laminate).

The fiber-reinforced resin plate having on its one or both sides a metal foil layer(s) can be produced by laminating a foil of a metal such as copper, nickel, aluminum or chromium onto one side or each of both sides of a prepeg or a laminate composed of a desired number of prepregs.

The forming method applicable in this step is not particularly limited as long as the half-cured resin composition contained in the prepreg is uniformly cured and as in the lamination of a plurality of prepregs these are uniformly bonded and integrated. For example, the pressure forming method is applicable.

In the pressure forming method, the fiber-reinforced resin plate is produced, for example, by heating a desired number of prepregs piled one upon another at 150° to 300° C., preferably 150° C. to 250° C., under a pressure of 10 to 200 kgf/cm$^2$, preferably 10 to 150 kgf/cm$^2$ for about 10 min to 3 hr.

The formed fiber-reinforced resin plate is preferably postcured by heating the plate at 150° to 300° C. for a period of several hours to several tens of hours.

The postcuring further improves the heat resistance and dimensional stability of the fiber-reinforced resin plate.

EFFECT OF THE INVENTION

The fiber-reinforced resin plate, the prepreg and the process for producing the fiber-reinforced resin plate according to the present invention provide a fiber-reinforced resin plate which is excellent not only in adhesion to a metal such as copper, heat resistance and electrical insulating properties but also in dimensional stability, strength and other mechanical properties, especially those at the time of heating.

EXAMPLES

The present invention will further be illustrated below with reference to the following Examples, which should not be construed as limiting the scope of the invention.

In the following Examples, the parts are by weight, unless otherwise specified. The characteristics of stock oil as a starting material for the polycondensation reaction are specified in Table 1. The stock oil is one obtained by distilling the bottom oil produced by fluid catalytic cracking (FCC) of vacuum gas oil.

TABLE 1

| | |
|---|---|
| Average molecular weight | 271 |
| Boiling point (°C.) | 241.5–466.5 |
| Ratio of aromatic hydrocarbon (fa) | 0.65 |
| Ratio of hydrogen of aromatic ring (Ha) (%) | 28 |

Note
(1) Average molecular weight: value measured according to the vapor pressure osmometry.
(2) Boiling point: value of °C. in terms of the atmospheric pressure, measured according to ASTM D-1160.

In the following Examples, the gelation time (the shorter the time, the higher the reactivity), the glass transition temperature (the greater the value, the more excellent the heat resistance), the thermal expansion coefficient (the smaller the value, the more excellent the dimensional stability), the peeling strength (the higher the value, the greater the adhesion to a metal foil) and the flexural strength (the higher the value, the greater the strength) were measured by the use of the following apparatus and according to the following measuring methods.

[Gelation time]
  measured at 140° C. in accordance with Japanese Industrial Standard (JIS) K6910.

[Glass transition temperature]
  Method: dynamic viscoelasticity method
  Instrument: DVE RHEOSPECTOLER model DVE-4V, manufactured by Rheology Co., Ltd.
  Loading method: tensile method
  Frequency for measurement: 10 Hz
  Heating-up rate: 5° C./min
  Displacement in dynamic measurement: $+5 \times 10^{-4}$ cm
  Test piece: 1.6 mm in width, 1 mm in thickness and 25 mm in span

[Thermal expansion coefficient]
  Instrument: TAS-2000 System, model TMAS140C manufactured by Rigaku Co., Ltd.
  Heating-up rate: 5° C./min
  Length of test piece: 1.6 mm
  Range of measuring temperature: 50° to 100° C.

[Peeling strength]
  measured in accordance with Japanese Industrial Standard (JIS) K6481.

[Flexural strength]
  measured in accordance with Japanese Industrial Standard (JIS) K6911.

EXAMPLE 1

334 g of the stock oil having the characteristics indicated in Table 1, 370 g of paraformaldehyde, 137 g of p-toluenesulfonic acid monohydrate and 678.5 g of p-xylene were charged into a glass reactor, and the temperature thereof was elevated to 95° C. under agitation. The mixture was heated at 95° C. for 1 hr. Then, 209 g of phenol was dropwise added at a rate of 1.3 g/min. After the completion of the addition of phenol, agitation was continued for 15 min. to effect reaction. Thereafter, the reaction mixture was poured into 3300 g of n-hexane to thereby precipitate a reaction product. The precipitate was separated from the unreacted components and solvent by filtration, and washed with 1600 g of n-hexane. The washed precipitate was dried in vacuo to thereby obtain a powdery crude modified phenolic resin containing an acid.

The resin powder was dissolved in a 10-fold weight of toluene, and insoluble matter mainly composed of p-toluenesulfonic acid monohydrate was filtered off. The thus obtained toluene solution of the modified phenolic resin was concentrated to a resin concentration of 50% by weight, thereby obtaining a toluene varnish of modified phenolic resin containing substantially no acid. A small amount of triethylenetetramine was added thereto to effect neutralization. The resultant resin varnish was put in a 3.3-fold weight of n-hexane to thereby precipitate the resin. The resin was collected by filtration, and dried in vacuo to thereby obtain 580 g of a powdery modified phenolic resin containing substantially no acid.

100 g of the thus obtained powdery modified phenolic resin, 200 g of phenol and 5 g of p-toluenesulfonic acid were charged into a 500 ml glass reactor. The mixture was heated while stirring at a rate of 250 to 350 rpm so that the temperature thereof rose to 95° C. The mixture was heated at 95° C. for 90 min for effecting reaction to thereby obtain a reaction product containing a highly reactive modified phenolic resin.

The thus obtained reaction product was dissolved in a 2-fold weight of a 4:1 mixture of toluene and methyl isobutyl ketone to thereby prepare a resin solution.

The resultant resin solution was washed with a mixture of distilled water and isopropanol to thereby extract and remove acid, unreacted components, etc. having been contained in the reaction product. Thereafter, the mixture of toluene and methyl isobutyl ketone was removed by the use of an evaporator, and the residue was heated in vacuo to thereby dry the same and obtain 190 g of a powdery highly reactive modified phenolic resin containing substantially no acid. Methyl ethyl ketone was added to the powdery resin in an amount such that the resin concentration was 60% by weight. Thus, 317 g of a varnish of a highly reactive modified phenolic resin was obtained.

Separately, 50 g of tetrafunctional epoxy resin (Araldite MY-9512 produced by Nippon Ciba Geigy Co., Ltd.) and 0.3 g of 2-ethyl-4-methylimidazole were dissolved in 18 g of methyl ethyl ketone to thereby obtain an epoxy resin varnish.

The obtained epoxy resin varnish was mixed with the above highly reactive modified phenolic resin varnish in proportions such that the modified phenolic resin content of the whole resin was 50% to thereby obtain a varnish having a resin concentration of 66% by weight. The gelation time of this varnish was measured at 140° C. in accordance with Japanese Industrial Standard (JIS) K6910. The results are shown in Table 2.

This varnish was impregnated into glass cloth (cloth 201 treated with aminosilane, produced by Unitika UM Glass Co., Ltd.), dried and heated at 125° C. for 8 min to thereby obtain prepregs having the impregnated resin partially cured.

Eight prepregs thus obtained were piled one upon another and formed into a fiber-reinforced resin laminate having a resin content of 45% by weight by heating at 175° C. under a pressure of 70 kg/cm² for 90 min. The properties of the fiber-reinforced resin laminate are shown in Table 2.

EXAMPLE 2

A powdery modified phenolic resin containing substantially no acid was obtained in the same manner as in Example 1. 100 g of the thus obtained powdery resin, 66 g of phenol, 40 g of toluene and 1.5 g of p-toluenesulfonic acid were charged into a 500 ml glass reactor. The mixture was heated while Stirring at a rate of 250 to 350 rpm so that the temperature thereof rose to 95° C. The mixture was heated at 95° C. for 60 min for effecting reaction to thereby obtain a reaction product containing a highly reactive modified phenolic resin.

The thus obtained reaction product was dissolved in a 2-fold weight of a 4:1 mixture of toluene and methyl alcohol to thereby prepare a resin solution.

The resultant resin solution was washed with a mixture of distilled water and isopropanol to thereby extract and remove acid, unreacted components, etc. having been contained in the reaction product. Thereafter, the mixture of toluene and methyl alcohol was removed by the use of an evaporator, and the residue was heated in vacuo to thereby dry the same and obtain 140 g of a powdery highly reactive modified phenolic resin containing substantially no acid. Methyl ethyl ketone was added to the powdery resin in an amount such that the resin concentration was 60% by weight. Thus, 233 g of a varnish of a highly reactive modified phenolic resin was obtained.

Separately, 50 g of the same tetrafunctional epoxy resin as in Example 1 and 0.3 g of 2-ethyl-4-methylimidazole were dissolved in 31 g of methyl ethyl ketone to thereby obtain an epoxy resin varnish.

The obtained epoxy resin varnish was mixed with the above highly reactive modified phenolic resin varnish in proportions such that the modified phenolic resin content of the whole resin was 50% to thereby obtain a varnish having a resin concentration of 60% by weight. The gelation time of this varnish was measured in the same manner as in Example 1. The results are shown in Table 2.

This varnish was impregnated into the same glass cloth as in Example 1, dried and heated at 125° C. for 10 min to thereby obtain prepregs having the impregnated resin partially cured.

Eight prepregs thus obtained were piled one upon another and formed into a fiber-reinforced resin laminate having a resin content of 45% by weight by heating at 175° C. under a pressure of 70 kg/cm$^2$ for 90 min. The properties of the fiber-reinforced resin laminate are shown in Table 2.

EXAMPLE 3

A toluene varnish of a modified phenolic resin containing substantially no acid, which had a resin concentration of 50% by weight, was obtained in the same manner as in Example 1.

200 g of the thus obtained toluene resin varnish, 200 g of phenol and 5.0 g of p-toluenesulfonic acid were charged into a 500 ml glass reactor. The mixture was heated while stirring at a rate of 250 to 300 rpm so that the temperature thereof rose to 95° C. The mixture was heated at 95° C. for 60 min for effecting reaction to thereby obtain a reaction product containing a highly reactive modified phenolic resin.

The thus obtained reaction product was dissolved in a 2-fold weight of a 4:1 mixture of toluene and methyl isobutyl ketone to thereby prepare a resin solution. The resultant resin solution was washed with a mixture of distilled water and isopropanol to thereby extract and remove acid, unreacted components, etc. having been contained in the reaction product. Thereafter, the mixture of toluene and methyl isobutyl ketone was removed by the use of an evaporator, and the residue was heated in vacuo to thereby dry the same and obtain 185 g of a powdery highly reactive modified phenolic resin containing substantially no acid.

Methyl ethyl ketone was added to the powdery resin in an amount such that the resin concentration was 60% by weight. Thus, 308 g of a varnish of a highly reactive modified phenolic resin containing substantially no acid was obtained. The gelation time of this varnish was measured in the same manner as in Example 1. The results are shown in Table 2.

A fiber-reinforced resin laminate was obtained in the same manner as in Example 1, except that use was made of the above highly reactive modified phenolic resin varnish. The properties thereof are shown in Table 2.

EXAMPLE 4

A toluene varnish of a modified phenolic resin containing substantially no acid, which had a resin concentration of 50% by weight, was obtained in the same manner as in Example 1.

200 g of the thus obtained toluene resin varnish, 66 g of phenol and 1.5 g of p-toluenesulfonic acid were charged into a 500 ml glass reactor. The mixture was heated while stirring at a rate of 250 to 300 rpm so that the temperature thereof rose to 65° C. The mixture was heated at 65° C. for 90 rain for effecting reaction to thereby obtain a reaction product containing a highly reactive modified phenolic resin.

The thus obtained reaction product was dissolved in a 2-fold weight of a 4:1 mixture of toluene and methyl alcohol to thereby prepare a resin solution. The resultant resin solution was washed with a mixture of distilled water and isopropanol to thereby extract and remove acid, unreacted components, etc. having been contained in the reaction product. Thereafter, the mixture of toluene and methyl alcohol was removed by the use of an evaporator, and the residue was heated in vacuo to thereby dry the same and obtain 145 g of a powdery highly reactive modified phenolic resin containing substantially no acid.

Methyl ethyl ketone was added to the powdery resin in an amount such that the resin concentration was 60% by weight. Thus, 242 g of a varnish of a highly reactive modified phenolic resin containing substantially no acid was obtained. The gelation time of this varnish was measured in the same manner as in Example 1. The results are shown in Table 2.

A fiber-reinforced resin laminate was obtained in the same manner as in Example 2, except that use was made of the above highly reactive modified phenolic resin varnish. The properties thereof are shown in Table 2.

EXAMPLE 5

A powdery modified phenolic resin containing substantially no acid was obtained in the same manner as in Example 1.

100 g of the thus obtained powdery modified phenolic resin containing substantially no acid, 66 g of phenol, 1 g of p-toluenesulfonic acid and 40 g of p-xylene were charged into a 500 ml glass reactor. The mixture was heated while stirring at a rate of 250 to 350 rpm so that the temperature thereof rose to 95° C. The mixture was heated at 95° C. for 30 rain for effecting reaction to thereby obtain a reaction product containing a highly reactive modified phenolic resin.

The thus obtained reaction product was dissolved in a 2-fold weight of a 4:1 mixture of toluene and methyl alcohol to thereby prepare a resin solution. The resultant resin solution was washed with a mixture of distilled water and isopropanol to thereby extract and remove acid, unreacted components, etc. having been contained in the reaction product. Thereafter, the mixture of toluene and methyl alcohol was removed by the use of an evaporator, and the residue was heated in vacuo to thereby dry the same and obtain 130 g of a powdery highly reactive modified phenolic resin containing substantially no acid. A 4:1 mixture of toluene and methyl alcohol was added to the powdery resin in an amount such that the resin concentration was 60% by weight. Thus, 220 g of a varnish of a highly reactive modified phenolic resin containing substantially no acid was obtained.

Separately, 70 g of phenolic novolak epoxy resin (Epicoat 152 produced by Yuka Shell Epoxy Co., Ltd.) and 0.6 g of 2-ethyl-4-methylimidazole were dissolved in 20 g of methyl ethyl ketone to thereby obtain an epoxy resin varnish.

The obtained epoxy resin varnish was mixed with the above highly reactive modified phenolic resin varnish in proportions such that the modified phenolic resin content of the whole resin was 30% to thereby obtain a varnish having a total resin concentration of 72% by weight. The gelation time of this varnish was measured in the same manner as in Example 1. The results are shown in Table 2.

This varnish was impregnated into the same glass cloth as in Example 1, dried and heated at 125° C. for 8 min to thereby obtain prepregs having the impregnated resin partially cured.

Eight prepregs thus obtained were piled one upon another and formed into a fiber-reinforced resin laminate having a resin content of 45% by weight by heating at 200° C. under a pressure of 70 kg/cm² for 60 min. The properties of the fiber-reinforced resin laminate are shown in Table 2.

EXAMPLE 6

60 g of bisphenol A epoxy resin (Epicoat 828 produced by Yuka Shell Epoxy Co., Ltd.) and 0.5 g of 2-ethyl-4methylimidazole were dissolved in 12 g of methyl ethyl ketone to thereby obtain an epoxy resin varnish.

The obtained epoxy resin varnish was mixed with the varnish of highly reactive modified phenolic resin containing substantially no acid which was obtained in Example 5 in proportions such that the modified phenolic resin content of the whole resin was 40% to thereby obtain a varnish having a total resin concentration of 72% by weight. The gelation time of this varnish was measured in the same manner as in Example 1. The results are shown in Table 2.

This varnish was impregnated into the same glass cloth as in Example 1, dried and heated at 125° C. for 8 min to thereby obtain prepregs having the impregnated resin partially cured.

Eight prepregs thus obtained were piled one upon another and formed into a fiber-reinforced resin laminate having a resin content of 45% by weight by heating at 150° C. under a pressure of 70 kg/cm² for 120 min. The resultant fiber-reinforced resin laminate postcured at 200° C. for 1 hr. The properties thereof are shown in Table 2.

EXAMPLE 7

A powdery modified phenolic resin containing substantially no acid was obtained in the same manner as in Example 1. 100 g of the thus obtained powdery resin, 88 g of phenol and 0.5 g of p-toluenesulfonic acid were charged into a 500 ml glass reactor. The mixture was heated while stirring at a rate of 250 to 350 rpm so that the temperature thereof rose to 95° C. The mixture was heated at 95° C. for 120 min for effecting reaction to thereby obtain a reaction product containing a highly reactive modified phenolic resin.

The thus obtained reaction product was dissolved in a 2-fold weight of a 4:1 mixture of toluene and methyl alcohol, and the same operation as in Example 1 was carried out. Thus, 175 g of a varnish of a highly reactive modified phenolic resin containing substantially no acid was obtained.

Separately, 60 g of bisphenol A epoxy resin (Epicoat 828 produced by Yuka Shell Epoxy Co., Ltd.) and 1.2 g of 2-ethyl-4-methylimidazole were dissolved in 19 g of methyl ethyl ketone in proportions such that the modified phenolic resin content of the whole resin was 40% to thereby obtain a varnish having a total resin concentration of 68% by weight. The gelation time of this varnish was measured in the same manner as in Example 1. The results are shown in Table 2.

This varnish was impregnated into the same glass cloth as in Example 1, dried and heated at 135° C. for 10 min to thereby obtain prepregs having the impregnated resin partially cured.

A fiber-reinforced resin laminate was obtained in the same manner as in Example 6, except that use was made of the obtained prepregs. The properties thereof are shown in Table 2.

Comparative Example 1

A powdery crude modified phenolic resin containing an acid was obtained in the same manner as in Example 1.

This resin powder was dissolved in a 10-fold weight of toluene, and insoluble matter composed mainly of p-toluenesulfonic acid monohydrate was filtered off to thereby prepare a toluene resin solution. The resultant toluene resin solution was concentrated to a resin concentration of 60% by weight, and a minute amount of triethylenetetramine was added. Thus, 1000 g of a varnish of crude modified phenolic resin having a resin concentration of 60% by weight was obtained.

A fiber-reinforced resin laminate was prepared in the same manner as in Example 1, except that the above varnish of crude modified phenolic resin was used in place of the highly reactive modified phenolic resin varnish and that the amount of 2-ethyl-4-methylimidazole was 1.0 g. The gelation time of the varnish and the properties of the fiber-reinforced resin laminate were measured. The results are shown in Table 2.

Comparative Example 2

A fiber-reinforced resin laminate was prepared in the same manner as in Example 5, except that the modified phenolic resin varnish obtained in Comparative Example 1 was used in place of the highly reactive modified phenolic resin varnish and that the amount of 2-ethyl-4-methylimidazole was 1.2 g. The gelation time of the varnish and the properties of the fiber-reinforced resin laminate were measured. The results are shown in Table 2.

Comparative Example 3

A fiber-reinforced resin laminate was prepared in the same manner as in Example 7, except that the modified phenolic varnish obtained in Comparative Example 1 was used in place of the highly reactive modified phenolic resin varnish. The properties thereof and the gelation time of the varnish were measured. The results are shown in Table 2.

TABLE 2

|  | Example | | | | | | | Comp. Ex. | | |
| --- | --- | --- | --- | --- | --- | --- | --- | --- | --- | --- |
|  | 1 | 2 | 3 | 4 | 5 | 6 | 7 | 1 | 2 | 3 |
| Composition |  |  |  |  |  |  |  |  |  |  |
| Modified phenolic resin |  |  |  |  |  |  |  |  |  |  |
| Example 1 (pts.) | 50 | — | — | — | — | — | — | — | — | — |
| Example 2 (pts.) | — | 50 | — | — | — | — | — | — | — | — |
| Example 3 (pts.) | — | — | 50 | — | — | — | — | — | — | — |
| Example 4 (pts.) | — | — | — | 50 | — | — | — | — | — | — |
| Example 5 (pts.) | — | — | — | — | 30 | 40 | — | — | — | — |
| Example 6 (pts.) | — | — | — | — | — | — | 40 | — | — | — |
| Com. Ex. 1 (pts.) | — | — | — | — | — | — | — | 50 | 30 | 40 |
| Molecular weight of modified phenolic resin (VPO)[*1] | 500 | 562 | 480 | 620 | 562 | 562 | 560 | 1190 | 1070 | 1070 |
| Epoxy resin |  |  |  |  |  |  |  |  |  |  |
| Araldite MY 9512[*2] (pts.) | 50 | 50 | 50 | 50 | — | — | — | 50 | — | — |
| Epicoat 828[*3] (pts.) | — | — | — | — | — | 60 | 60 | — | — | 60 |
| Epicoat 152[*4] (pts.) | — | — | — | — | 70 | — | — | — | 70 | — |
| Curing Agent |  |  |  |  |  |  |  |  |  |  |
| 2-ethyl-4-methylimidazole[*5] (pts.) | 0.3 | 0.3 | 0.3 | 0.3 | 0.6 | 0.5 | 1.2 | 1.0 | 1.2 | 1.2 |
| Forming Conditions |  |  |  |  |  |  |  |  |  |  |
| Forming temp. (°C.) | 175 | 175 | 175 | 175 | 200 | 150 | 150 | 175 | 200 | 150 |
| Forming time (hr) | 1.5 | 1.5 | 1.5 | 1.5 | 1.0 | 2.0 | 2.0 | 1.5 | 1.0 | 2.0 |
| Postcuring temp. (°C.) | — | — | — | — | — | 200 | 200 | — | — | 200 |
| Postcuring time (hr) | — | — | — | — | — | 1 | 1 | — | — | 1 |
| Properties |  |  |  |  |  |  |  |  |  |  |
| Gelation time (Sec.) | 188 | 230 | 194 | 232 | 140 | 195 | 188 | 260 | 195 | 275 |
| Peeling strength (kgf/cm) | 1.27 | 1.40 | 1.25 | 1.38 | 1.58 | 1.50 | 1.27 | 1.10 | 1.30 | 1.07 |
| Flexural strength (kgf/cm$^2$) | 4620 | 4350 | 4590 | 4300 | 4920 | 4890 | 5070 | 2550 | 4688 | 4105 |
| Flexural strength (150° C.) (kgf/cm$^2$) | 3230 | — | — | — | 2520 | — | 2650 | 1170 | 2010 | 1770 |
| Linear expansion coefficient ($10^{-5}$/°C.) | 4.65 | 4.69 | 4.70 | 4.93 | 6.90 | 5.41 | 6.26 | 7.71 | 9.85 | 8.38 |
| Glass transition temperature (°C.) | 203 | 172 | 200 | 170 | 134 | 140 | 136 | 33 | 124 | 125 |

[*1] Average molecular weight: Value measured according to the vapor pressure osmometory
[*2] Araldite MY9512: Produced by Nippon-Ciba Geigy Co., Ltd.
[*3] Epicoat E828: Produced by Yuka Shell Epoxy Co., Ltd.
[*4] Epicoat E152: Produced by Yuka Shell Epoxy Co., Ltd.
[*5] 2-Ethyl-4-methylimidazole: Produced by Shikoku Chemicals Corporation.

What is claimed is:

1. A fiber-reinforced resin plate comprising a fibrous base material and a matrix, the matrix being formed by curing a resin composition comprising a highly reactive modified phenolic resin (A) prepared by polycondensing a petroleum heavy oil or pitch, a formaldehyde polymer and a phenol in the presence of an acid catalyst to thereby prepare a modified phenolic resin and reacting the resulant modified phenolic resin with a phenol in the presence of an acid catalyst but in the absence of a formaldehyde polymer and other crosslinking agents to thereby lower the molecular weight of the modified phenolic resin, and an epoxy resin (B).

2. The fiber-reinforced resin plate as claimed in claim 1, which is in the form of a laminate comprising a plurality of fibrous base material layers.

3. The fiber-reinforced resin plate as claimed in claim 1, wherein the resin composition contains highly reactive modified phenolic resin (A) and the epoxy resin (B) in a mixing weight ratio of 10/90 to 90/10.

4. A prepreg comprising a fibrous base material and a resin composition impregnated into the fibrous base material and half-cured, the resin composition comprising a highly reactive modified phenolic resin (A) prepared by polycondensing a petroleum heavy oil or pitch, a formaldehyde polymer and a phenol in the presence of an acid catalyst to thereby prepare a modified phenolic resin and reacting the resultant modified phenolic resin with a phenol in the presence of an acid catalyst but in the absence of a formaldehyde polymer and other crosslinking agents to thereby lower the molecular weight of the modified phenolic resin, and an epoxy resin (B).

5. A process for producing a fiber-reinforced resin plate comprising:

dissolving in an organic solvent a resin composition comprising a highly reactive modified phenolic resin (A) prepared by polycondensing a petroleum heavy oil or pitch, a formaldehyde polymer and a phenol in the presence of an acid catalyst to thereby prepare a modified phenolic resin and reacting the resultant modified phenolic resin with a phenol in the presence of an acid catalyst but in the absence of a formaldehyde polymer and other crosslinking agents to thereby lower the molecular weight of the modified phenolic resin, an epoxy resin (B) and a curing agent and/or curing accelerator (C) to thereby prepare a varnish, impregnating a fibrous base material with the varnish, followed by drying, and half-curing the resin composition to thereby prepare a prepreg, and completely curing the resin composition contained in the prepreg.

6. The process for producing a fiber-reinforced resin plate as claimed in claim 5, wherein a plurality of the prepregs are prepared and laminated prior to the complete curing of the resin composition.

7. The process for producing a fiber-reinforced resin plate as claimed in claim 5, wherein the varnish is prepared by mixing a phenolic resin varnish obtained by dissolving the highly reactive modified phenolic resin (A) in an organic solvent with an epoxy resin varnish obtained by dissolving the epoxy resin (B) in an organic solvent.

8. The process for producing a fiber-reinforced resin plate as claimed in claim 5, wherein the varnish is prepared by adding and dissolving the epoxy resin (B) in a phenolic resin varnish obtained by dissolving the highly reactive modified phenolic resin (A) in an organic solvent.

9. The process for producing a fiber-reinforced resin plate as claimed in claim 5, wherein the organic solvent is at least one member selected from the group consisting of aromatic hydrocarbons, amides, ketones, halogenated aromatic hydrocarbons and alcohols.

10. The process for producing a fiber-reinforced resin plate as claimed in claim 9, wherein the aromatic hydrocarbon is at least one compound selected from the group consisting of benzene, toluene and xylene.

11. The process for producing a fiber-reinforced resin plate as claimed in claim 5, wherein the resin composition contained in the prepreg is completely cured by thermal curing treatment at 150° to 300° C.

12. A fiber-reinforced resin plate comprising
   a fibrous base material, and
   a matrix,
wherein said matrix is formed by curing a resin composition comprising
   A) a reactive modified phenolic resin, and
   B) an epoxy resin,
wherein said reactive modified phenolic resin (A) is prepared by reacting, in the presence of an acid catalyst,
   a modified phenolic resin, and
   a phenol,
to thereby lower the molecular weight of the modified phenolic resin, wherein said modified phenolic resin is prepared by polycondensing, in the presence of an acid catalyst,
   a petroleum heavy oil or pitch,
   a formaldehyde polymer, and
   a phenol.

13. The fiber-reinforced resin plate of claim 12, which is in the form of a laminate comprising a plurality of fibrous base material layers.

14. The fiber-reinforced resin plate of claim 12, wherein said resin composition contains said reactive modified phenolic resin (A) and said epoxy resin (B) in a weight ratio of 10/90 to 90/10.

15. A fiber-reinforced resin plate of claim 12, wherein the reactive modified phenolic resin (A) has a number average molecular weight of from 300 to 800.

16. A prepreg comprising
   a fibrous base material,
   a resin composition impregnated into said fibrous base material and half-cured,
wherein said resin composition comprises
   A) a reactive modified phenolic resin, and
   B) an epoxy resin,
wherein said reactive modified phenolic resin (A) is prepared by reacting, in the presence of an acid catalyst,
   a modified phenolic resin, and
   a phenol,
to thereby lower the molecular weight of the modified phenolic resin, wherein said modified phenolic resin is prepared by polycondensing, in the presence of an acid catalyst,
   a petroleum heavy oil or pitch,
   a formaldehyde polymer, and
   a phenol.

17. A process for producing a fiber-reinforced resin plate comprising
   dissolving in an organic solvent a resin composition comprising
      A) a reactive modified phenolic resin, and
      B) an epoxy resin, and
      C) a curing agent and/or curing accelerator
   to thereby prepare a varnish, impregnating said fibrous base material with the varnish, followed by drying and half-curing said resin composition to thereby prepare a prepreg, and completely curing said resin composition contained in the prepreg,
wherein said reactive modified phenolic resin (A) is prepared by reacting, in the presence of an acid catalyst,
   a modified phenolic resin, and
   a phenol,
to thereby lower the molecular weight of the modified phenolic resin, wherein said modified phenolic resin is prepared by polycondensing, in the presence of an acid catalyst,
   a petroleum heavy oil or pitch,
   a formaldehyde polymer, and
   a phenol.

18. The process for producing the fiber-reinforced resin plate of claim 17, wherein a plurality of said prepregs are prepared and laminated prior to the complete curing of said resin composition.

19. The process for producing a fiber-reinforced resin plate of claim 17, wherein the varnish is prepared by mixing
   a phenolic resin varnish obtained by dissolving said reactive modified phenolic resin (A) in an organic solvent with
   an epoxy resin varnish obtained by dissolving the epoxy resin (B) in an organic solvent.

20. The process for producing a fiber-reinforced resin plate of claim 17, wherein the varnish is prepared by adding and dissolving said epoxy resin (B) in a phenolic resin varnish obtained by dissolving said reactive modified phenolic resin (A) in an organic solvent.

21. The process for producing a fiber-reinforced resin plate of claim 17, wherein the organic solvent is at least one member selected from the group consisting of aromatic hydrocarbons, amides, ketones, halogenated aromatic hydrocarbons and alcohols.

22. The process for producing a fiber-reinforced resin plate of claim 21 wherein the aromatic hydrocarbon is at least one compound selected from the group consisting of benzene, toluene and xylene.

23. The process for producing a fiber-reinforced resin plate of claim 17, wherein said resin composition contained in the prepreg is completely cured by thermal curing treatment at 150° to 300° C.

* * * * *